(12) United States Patent
Bersted et al.

(10) Patent No.: US 8,057,732 B2
(45) Date of Patent: Nov. 15, 2011

(54) METHOD FOR MAKING A POLYAMIDE HOLLOW BODY

(75) Inventors: Bruce H. Bersted, Cumming, GA (US); James K. Doty, Alpharetta, GA (US); Jean De Canniere, Brussels (BE); Claude Dehennau, Waterloo (BE); Gregory Warkoski, Cumming, GA (US); Corinne Bushelman, Cumming, GA (US); Johan Billiet, Ghent (BE)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 0 days.

(21) Appl. No.: 12/849,039

(22) Filed: Aug. 3, 2010

(65) Prior Publication Data

US 2010/0314793 A1    Dec. 16, 2010

Related U.S. Application Data

(63) Continuation of application No. 10/568,692, filed as application No. PCT/US2004/024383 on Aug. 17, 2004, now Pat. No. 7,807,245.

(60) Provisional application No. 60/496,011, filed on Aug. 19, 2003.

(51) Int. Cl.
*B29C 45/00* (2006.01)
*B29C 47/00* (2006.01)
*B32B 37/00* (2006.01)

(52) U.S. Cl. ............... 264/514; 264/464; 264/177.14
(58) Field of Classification Search .................. 264/464, 264/514, 177.14; 156/244.11
See application file for complete search history.

(56) References Cited

U.S. PATENT DOCUMENTS

| | | | |
|---|---|---|---|
| 5,170,011 | A | 12/1992 | Martucci |
| RE34,447 | E | 11/1993 | Poppe et al. |
| 5,416,189 | A | 5/1995 | Vandevijver et al. |
| 5,436,294 | A | 7/1995 | Desio et al. |
| 5,447,980 | A | 9/1995 | Reichmann |
| 5,469,892 | A | 11/1995 | Noone et al. |
| 5,480,690 | A | 1/1996 | Stenger et al. |
| 5,524,673 | A | 6/1996 | Noone et al. |
| 5,665,815 | A | 9/1997 | Vankan et al. |
| 5,884,671 | A | 3/1999 | Noone et al. |
| 5,884,672 | A | 3/1999 | Noone et al. |
| 6,177,162 | B1 | 1/2001 | Siour et al. |
| 6,269,804 | B1 | 8/2001 | Braun et al. |
| 6,306,951 | B1 | 10/2001 | Montag et al. |
| 6,359,055 | B1 | 3/2002 | Delannoy et al. |
| 6,372,870 | B1 | 4/2002 | Kitahara et al. |
| 6,391,975 | B1 | 5/2002 | Abusleme et al. |
| 6,524,671 | B1 | 2/2003 | Spohn |
| 6,531,529 | B2 | 3/2003 | Bersted et al. |

(Continued)

FOREIGN PATENT DOCUMENTS

EP    0 477 027    3/1992

(Continued)

OTHER PUBLICATIONS

Third Party Observations (Article 115 EPS), mailed Aug. 9, 2011, against European Patent No. 04 779 443.3 (EP 1 685 163 A1).

*Primary Examiner* — Michael C Miggins
(74) *Attorney, Agent, or Firm* — Oblon, Spivak, McClelland, Maier & Neustadt, L.L.P.

(57) ABSTRACT

Method for making a hollow body comprising, as sole layer(s), at least one layer L1 consisting of a polyamide composition comprising an aromatic polyamide and an impact modifier, said method comprising extruding the polyamide composition through a die.

22 Claims, 2 Drawing Sheets

U.S. PATENT DOCUMENTS

| | | |
|---|---|---|
| 6,569,946 B2 | 5/2003 | Abusleme et al. |
| 6,634,389 B2 | 10/2003 | Noone et al. |
| 6,765,062 B2 | 7/2004 | Chin et al. |
| 6,896,005 B2 | 5/2005 | Noone et al. |
| 6,989,198 B2 | 1/2006 | Masuda et al. |
| 2002/0090472 A1 | 7/2002 | Savic |
| 2003/0027931 A1 | 2/2003 | Ono et al. |
| 2004/0126523 A1 | 7/2004 | Masuda et al. |
| 2006/0280888 A1 | 12/2006 | Bersted et al. |
| 2007/0104907 A1 | 5/2007 | Nishioka et al. |
| 2008/0057244 A1 | 3/2008 | Bushelman et al. |
| 2008/0118756 A1 | 5/2008 | Bushelman et al. |
| 2008/0241562 A1 | 10/2008 | Bushelman et al. |

FOREIGN PATENT DOCUMENTS

| | | |
|---|---|---|
| EP | 0 559 445 | 9/1993 |
| EP | 0 901 507 | 3/1999 |
| FR | 2 766 548 | 1/1999 |
| WO | WO 00/38917 | 7/2000 |
| WO | WO 02/076734 | 10/2002 |
| WO | WO 2005/023542 | 3/2005 |

METHOD FOR MAKING A POLYAMIDE HOLLOW BODY

REFERENCE TO RELATED APPLICATIONS

This application is a continuation of U.S. application Ser. No. 10/568,692, filed Jul. 31, 2006, now U.S. Pat. No. 7,807,245, which is a U.S. national stage application under 35 U.S.C. §371 of International Application No. PCT/US2004/024383 filed Aug. 17, 2004, which claims priority to U.S. provisional application 60/496,011 filed Aug. 19, 2003, the all content of all these applications being herein incorporated by reference for all purposes.

FIELD OF THE INVENTION

The invention relates to hollow bodies made of impact-modified polyamide. The hollow bodies according to the invention comprise, as sole layer(s), (1) at least one layer L1 comprising an aromatic polyamide and an impact modifier, and, optionally, (2) at least one layer L2 comprising an aliphatic polyamide.

Preferred hollow bodies disclosed include tubing, for example tubing useful in the automotive industry for, e.g., moving fluids such as gasoline, engine vapor, etc.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. The description is to be regarded as illustrative in nature, and not as restrictive.

BACKGROUND OF THE INVENTION

Polymeric hollow body articles have many uses including liquid handling and storage containers, hoses, tubing, and pipes. The use of polymeric hollow bodies, such as tubing and hoses, is increasing. One such application is motor vehicle fuel line tubing and hoses. At present these applications include the use of both monolayer and multilayer aliphatic polyamide (PA), high-heat rubber composites, and braided polytetrafluoroethylene (PTFE). At the same time there is also a trend toward higher temperatures in both diesel and passenger motor vehicle under-the-hood applications. While braided PTFE and high heat rubber composites can be used in these higher heat environments, the constructions are often complex and costly. The use aliphatic polyamide also has limitations in these high heat applications. In particular, PA12 has limitations with regard to both permeation of fuel and long term heat aging at the higher temperatures present in newer vehicles. Multilayer constructions are often subject to delamination, especially where fluoropolymer layers are present, and generally require special chemical bonding between layers as in U.S. Pat. No. 6,524,671.

There are different requirements for the vapor return line and the liquid fuel line in today's fuel systems. In the vapor line, one of the primary requirements is the barrier property to prevent vapors from escaping into the environment, as well as the long-term thermal and mechanical requirements. Included in the mechanical requirements are sufficient flexibility and impact strength for both fabrication and safety. In addition to the requirements for vapor lines, liquid lines also include the requirement that essentially no components in the fuel line contaminates the fuel, which could lead to problems, such as clogged fuel injectors.

SUMMARY OF THE INVENTION

The present invention addresses the problems of the prior art and provides a hollow body comprising, as sole layer(s), (1) at least one layer L1 comprising an aromatic polyamide and an impact modifier, and, optionally, (2) at least one layer L2 comprising an aliphatic polyamide. In a preferred embodiment L1 is the sole layer of the hollow body. In another preferred embodiment, layers L1 and L2 are in direct contact with one another and are the sole layers comprised in the hollow body. In a further preferred embodiment the hollow body comprises three and only three contiguous layers, in the order L1/L2/L1. In yet a further preferred embodiment the hollow body comprises two or more contiguous L1 layers. In a further preferred embodiment the hollow body is constituted by any number of contiguous layers of the order $[(L1)_n/(L2)_m]_x$ where x is any integer of 1 or greater, n is any integer of 1 or greater, and m is any integer (e.g., 0, 1, 2, etc.). In another preferred embodiment, the hollow body does not contain a fluoropolymer layer. Where the invention hollow body is a multilayer construction, each of the L1 and L2 layers may be the same or different from one another.

The hollow bodies of the invention may be made in any manner desired from the identified materials to produce layers L1 and L2, such as by extrusion, such techniques being well known to those of ordinary skill in the art. Preferably, the hollow body of the invention is in the shape of a tube or hose, these terms being used interchangeably herein. The size, shape, wall thicknesses, surface texture, etc. of the invention hollow bodies are not limited in any way.

DETAILED DESCRIPTION OF THE INVENTION

Figure 1:
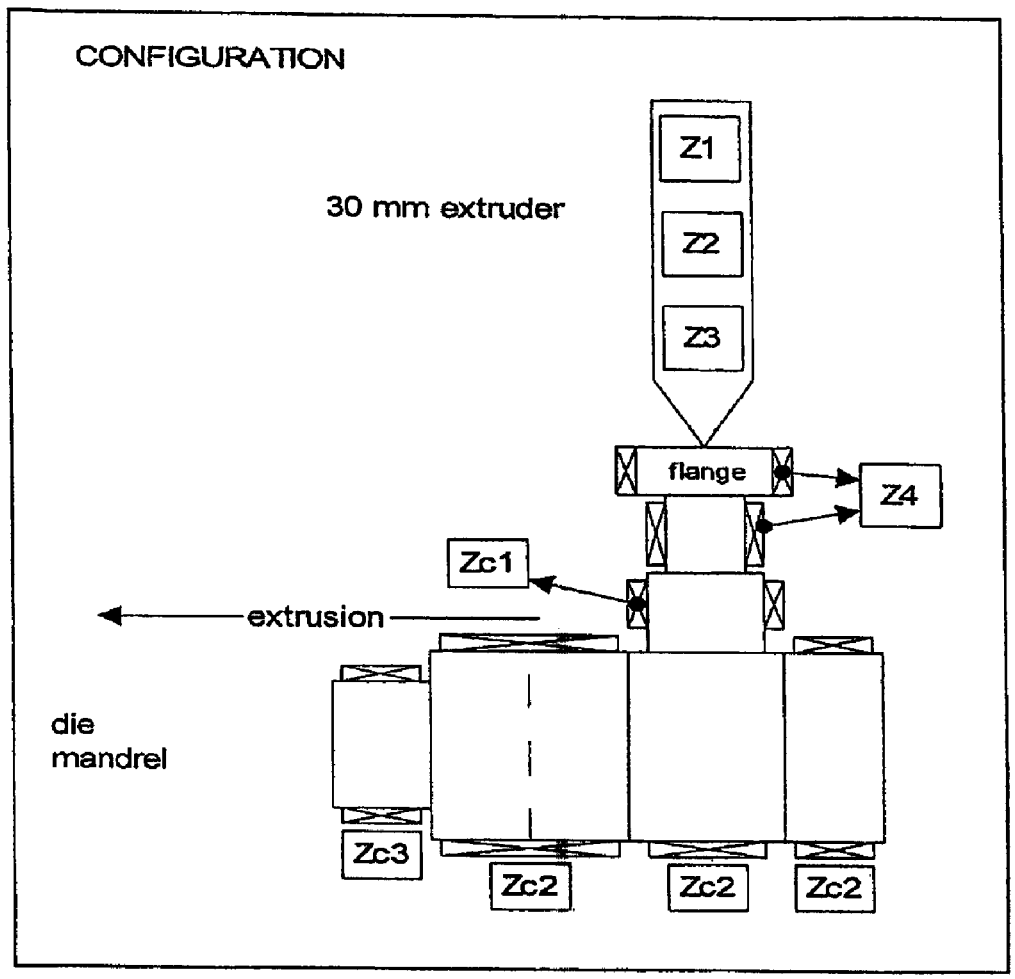
FIG. 1 is an illustration of an extrusion set up useful to extrude monolayer hoses according to the invention.

As used herein, the term "hollow body" is understood to mean any structure having an empty or concave part. In particular, the hollow body may have the shape of a tube, hose or a pipe, a container, etc. The term "inner layer" is understood to mean the innermost layer of the hollow body on the same side as the empty or concave part of this body. Typically, the inner layer comes in contact with the "content" intended to fill, flow through, etc. the invention hollow body. The term "outer layer" is understood to mean the outermost layer of the hollow body on the side away from the empty or concave part of this body; that is, there are no other layers of the hollow body immediately adjacent and external to the outer layer. Of course, these terms "inner layer" and "outer layer" only apply for multilayered embodiments of the invention. Where the hollow body is constituted by a single layer, it is termed a "monolayer". Hollow bodies within the scope of this invention include liquid storage and handling containers, tubing, pipes, and hoses. In particular, certain embodiments of the present invention are fuel and vapor line hoses for motor vehicles, aircraft, watercraft, recreational vehicles, and agricultural and industrial equipment including both liquid fuel delivery lines and vapor recovery lines.

Polyamide

Polyamides are, generally speaking, polymers containing a repeating amide (CONH) functionality. Typically, polyamides are formed by reacting diamine and diacid monomer units (e.g., nylon 6,6), or by polymerizing an amino carboxylic acid or caprolactam (e.g., nylon 6). Polyamides are well known materials. Polyamides that are useful herein include those described in U.S. Pat. Nos. 6,531,529, 6,359,055, 5,665,815, 5,436,294, 5,447,980, RE34,447, U.S. Pat. No. 6,524,671 (DuPont), U.S. Pat. No. 6,306,951 (BP Corp.) and U.S. Pat. No. 5,416,189 as well as those sold by Solvay Advanced Polymers under the Amodel® and IXEF® brand names. The invention relates to both aromatic and aliphatic polyamides. The aromaticity of the aromatic recurring units can come from the diacid and/or from the diamine for polyamides resulting from polycondensation. Preferably, the polyamides used herein, especially the aromatic polyamides, are prepared by polycondensation.

Polyamide Composition L1

The L1 polyamide compositions for hollow bodies useful herein comprise an aromatic polyamide and an impact modifier.

Aromatic Polyamide

Aromatic polyamides are polymers comprising more than 50 mol % of "Type 1" repeating units, based on 100 mol % repeating units in the polymer. Type 1 repeating units have at least one CONH group in the polymer chain. In addition, Type 1 repeating units are characterized in that at least 30 mol % thereof comprise an aromatic group. Thus, the minimum content of aromatic group-containing repeating units in an aromatic polyamide herein is more than 15 mol % based on 100 mol % repeating units in the polymer. Preferably, the aromatic polyamide of the invention comprises at least 20 mol %, based on 100 mol % of monomers making up the polyamide, of monomers comprising an aromatic group. Although not required, such aromatic groups typically originate in the polycondensation reaction between diacid and diamine monomers. Aromatic groups can come from the diacid and/or diamine monomers. Diacid monomers include terephthalic acid, isophthalic acid, phthalic acid (1,2-Benzenecarboxylic acid), etc. In preferred embodiments the aromatic polyamide comprises at least 30 mol %, based on 100 mol % of monomers making up the polyamide, of monomers comprising an aromatic group, including 35, 40, 45, 50, 55, 60, 65, 70, 75, 80, 85, etc. mol %.

One class of preferred aromatic polyamides are PMXDAs, i.e. aromatic polyamides comprising more than 50 mole % of recurring units formed by the polycondensation reaction between at least one aliphatic diacid and metaxylylenediamine.

The aliphatic diacid can be notably adipic acid.

Suitable PMXDAs are notably available as IXEF® PMX-DAs from Solvay Advanced Polymers.

Another class of preferred aromatic polyamides are polyphthalamides (PPA), i.e. aromatic polyamides comprising more than 50 mole % of recurring units formed by the polycondensation reaction between at least one of terephthalic acid, isophthalic acid, and phthalic acid and at least one aliphatic diamine.

The aliphatic diamine can be notably hexamethylenediamine, nonanediamine, 2-methyl-1,5 pentadiamine, and 1,4-diaminobutane.

Suitable polyphthalamides are notably available as AMODEL® polyphthalamides from Solvay Advanced Polymers, L.L.C.

Among polyphthalamides, polyterephthalamides are preferred. Polyterephthalamides are defined as aromatic polyamides comprising more than 50 mole % of recurring units formed by the polycondensation reaction between terephthalic acid and at least one diamine.

One group of preferred polyterephthalamides are polyterephthalamides consisting essentially of recurring units formed by the polycondensation reaction between terephthalic acid and at least one aliphatic diamine. In the polyterephtalamides of this group, the aliphatic diamine comprises preferably from 3 to 9 carbon atoms, and very preferably, it comprises 6 carbon atoms. An example of aliphatic diamine comprising 6 carbon atoms is hexamethylene diamine.

A second group of preferred polyterephthalamides are polyterephthalamides consisting essentially of recurring units formed by the polycondensation reaction between terephthalic acid, isophthalic acid and at least one aliphatic diamine. In this embodiment, the mole ratio of the terepthalic acid and the isopthalic acid can be from 50 to 80 (including 55, 60, 65, 70, and 75) for the terepthalic acid and from 10 to 40 (including 15, 20, 25, and 35) for the isopthalic acid. In another embodiment, the mole ratio can be from 35 to 65 for the terepthalic acid and not more than 20 for the isopthalic acid.

A third group of preferred polyterephthalamides are polyterephthalamides consisting essentially of recurring units formed by the polycondensation reaction between terephthalic acid, at least one aliphatic diacid and at least one aliphatic diamine. In this embodiment, the mole ratio of the terepthalic acid and aliphatic diacid can be from 50 to 80 (including 55, 60, 65, 70, and 75) for the terepthalic acid and not more than 25 (including 5, 10, 15, and 20) for the aliphatic diacid. In another embodiment, the mole ratio can be from 35 to 65 for the terepthalic acid and from 30 to 60 for the aliphatic diacid.

A fourth group of preferred polyterephthalamides are polyterephthalamides consisting essentially of recurring units formed by the polycondensation reaction between terephthalic acid, isophthalic acid, at least one aliphatic diacid and at least one aliphatic diamine. In this embodiment, the mole ratio of the terepthalic acid and aliphatic diacid can be from 50 to 80 (including 55, 60, 65, 70, and 75) for the terepthalic acid; from 10 to 40 (including 15, 20, 25, and 35) for the isopthalic acid; and not more than 25 (including 5, 10, 15, and 20) for the aliphatic diacid. In another embodiment, the mole ratio can be from 35 to 65 for the terepthalic acid; not more than 20 for the isopthalic acid; and from 30 to 60 for the aliphatic diacid.

Another preferred aromatic polyamide useful herein is one made from terephthalic acid, adipic acid, optionally isophthalic acid, and hexamethylene diamine.

In another preferred embodiment the aromatic polyamide is a polyamide with at least 50 mol. %, including up to 100 mol %, of recurring units obtained by the polycondensation reaction between terephthalic, isophthalic, adipic acid; and at least one diamine, preferably an aliphatic one. Within this group, the mole ratio of terephthalic/isophthalic/adipic acid can be from 50 to 80/from 10 to 40/not more than 25. In another embodiment the mole ratio of terephthalic/isophthalic/adipic acid can be from 35 to 65/not more than 20/from 30 to 60. In preferred embodiments the diamine component for these acid mixtures is HMDA.

In certain embodiments of the present invention, the dicarboxylic acid component used in forming the polyphthalamide comprises a mole ratio of aromatic dicarboxylic groups in the range from at least about 50 mole % aromatic groups to about 100% aromatic groups. In a preferred embodiment of the present invention, the polyphthalamide polymer comprises from about 50 mole % to about 95 mole % hexamethylene terephthalamide units, from about 25 mole % to about 0 mole % hexamethylene isophthalamide units, and from about 50 mole % to about 5 mole % hexamethylene adipamide units. Another useful aromatic polyamide is one made from terephthalic acid, isophthalic acid and an aliphatic amine such as HMDA, for example using a 70/30 ratio of TA/IA. Particularly suitable polyphthalamides for use in the present invention are available as AMODEL® A-1000, A-4000, A-5000, and A-6000 polyphthalamides from Solvay Advanced Polymers, LLC. Suitable polyphthalamides for use in the present invention are disclosed in previously referenced U.S. Pat. Nos. 5,436,294; 5,447,980; and Re34,447 to Poppe et al.

Of course, more than one aromatic polyamide may be used in polyamide composition L1.

Impact Modifier

The impact modifiers useful herein are not particularly limited, so long as they impart useful properties to the aromatic polyamide component of the invention L1 layer, such as sufficient tensile elongation at yield and break. For example, any rubbery low-modulus functionalized polyolefin impact modifier with a glass transition temperature lower than 0° C. is suitable for this invention, including functionalized impact modifiers disclosed in U.S. Pat. Nos. 5,436,294 and 5,447,980. Useful impact modifiers include polyolefins, preferably functionalized polyolefins, and especially elastomers such as SEBS and EPDM.

Useful functionalized polyolefin impact modifiers are available from commercial sources, including maleated polypropylenes and ethylene-propylene copolymers available as EXXELOR™ PO and maleic anhydride-functionalized ethylene-propylene copolymer rubber comprising about 0.6 weight percent pendant succinic anhydride groups, such as EXXELOR®. VA 1801 from the Exxon Mobil Chemical Company; acrylate-modified polyethylenes available as SURLYN®, such as SURLYN® 9920, methacrylic acid-modified polyethylene from the DuPont Company; and PRIMACOR®, such as PRIMACOR® 1410 XT, acrylic acid-modified polyethylene, from the Dow Chemical Company; maleic anhydride-modified styrene-ethylene-butylene-styrene (SEBS) block copolymer, such as KRATON® FG1901X, a SEBS that has been grafted with about 2 weight % maleic anhydride, available from Kraton Polymers; maleic anhydride-functionalized ethylene-propylene-diene monomer (EPDM) terpolymer rubber, such as ROYALTUF® 498, a 1% maleic anhydride functionalized EPDM, available from the Crompton Corporation. The hollow bodies of the present invention are not limited to only those formed with these impact modifiers. Suitable functional groups on the impact modifier include any chemical moieties that can react with end groups of the polyamide to provide enhanced adhesion to the high temperature matrix.

Other functionalized impact modifiers that may also be used in the practice of the invention include ethylene-higher alpha-olefin polymers and ethylene-higher alpha-olefin-diene polymers that have been provided with reactive functionality by being grafted or copolymerized with suitable reactive carboxylic acids or their derivatives such as, for example, acrylic acid, methacrylic acid, maleic anhydride or their esters, and will have a tensile modulus up to about 50,000 psi determined according to ASTM D-638. Suitable higher alpha-olefins include $C_3$ to $C_8$ alpha-olefins such as, for example, propylene, butene-1, hexene-1 and styrene. Alternatively, copolymers having structures comprising such units may also be obtained by hydrogenation of suitable homopolymers and copolymers of polymerized 1-3 diene monomers. For example, polybutadienes having varying levels of pendant vinyl units are readily obtained, and these may be hydrogenated to provide ethylene-butene copolymer structures. Similarly, hydrogenation of polyisoprenes may be employed to provide equivalent ethylene-isobutylene copolymers. The functionalized polyolefins that may be used in the present invention include those having a melt index in the range of about 0.5 to about 200 g/10 min.

Suitable dienes for use in the preparation of ethylene-alpha-olefin-diene terpolymers are non-conjugated dienes having 4 to about 24 carbon atoms, examples of which include 1,4-hexadiene, dicyclopentadiene and alkylidene norbornenes such as 5-ethylidene-2-norbornene. Mole fractions of ethylene units and higher alpha-olefin units in the ethylene-higher alpha-olefin copolymer rubbers generally range from about 40:60 to about 95:5. Ethylene-propylene copolymers having about 50 to about 95 mole percent ethylene units and about 5 to about 50 mole % propylene units are included among these. In terpolymers comprising polymerized diene monomer, the diene unit content can range up to about 10 mole %, and about 1 to about 5 mole % in certain embodiments. Also suitable are the corresponding block copolymers comprising two or more polymeric blocks, each formed of one or more monomers selected from ethylene and the higher alpha-olefin. The functionalized polyolefins will generally further comprise about 0.1 to about 10 weight percent functional groups.

Other impact modifiers useful herein include those described in U.S. Pat. No. 6,765,062 (Ciba Specialty Chemicals Corporation) and EP 901 507 B1 (DuPont).

Still other impact modifiers useful herein include acrylic impact modifiers commercialized as Paraloid® impact modifiers by Rohm & Haas.

The amount of impact modifier present in composition L1 is not limited and will preferably be a quantity sufficient to impart sufficient tensile elongation at yield and break. Generally, polyamide composition L1 will comprise from about 2 weight % to about 40 weight % impact modifier, based on total weight of composition L1, including for example 5, 10, 15, 20, 25, 30 and 35 weight %. However, the impact modifier can be present in amounts as little as, e.g., 0.1 weight %.

The impact modifier and aromatic polyamide can be mixed together in any manner, and mixing can occur before, e.g., extrusion, or the materials may be mixed in the extruder.

Of course, more than one impact modifier may be used in Polyamide composition L1.

Polyamide Composition L2

The L2 polyamide compositions useful herein form optional layers of the invention hollow body and comprise an aliphatic polyamide. Aliphatic polyamides are polymers comprising more than 50 mol % of "Type 2" repeating units, based on 100 mol % repeating units in the polymer. Type 2 repeating units have at least one CONH group in the polymer chain. In addition, Type 2 repeating units are characterized in that less than 30 mol % thereof comprise an aromatic group. Thus, the maximum content of aromatic group-containing repeating units in an aliphatic polyamide herein is less than 15 mol % based on 100 mol % repeating units in the polymer. Preferably, the aliphatic polyamide comprises more than 85 mol %, for example 90%, etc., based on 100 mol % of monomers making up the polyamide, of monomers comprising an aliphatic group and having no aromatic group. Such aliphatic groups originate, in a polycondensation reaction, from both diacid and diamine monomers. Preferred aliphatic diamines include those comprising 4 to 12 carbon atoms, such as hexamethylene diamine (HMDA), nonane diamine, 2-methyl-1,5 pentadiamine, and 1,4-diaminobutane, etc. One useful diacid source of aliphatic units is adipic acid. Useful examples of invention aliphatic L2 polyamide compositions include aliphatic polyamides such as PA6, PA6,6, PA4,6, PA11, PA12, and PA6,12.

Of course, more than one aliphatic polyamide may be used in polyamide composition L2. In addition, the impact modifiers described above may be used in polyamide composition L2 if desired.

Additives

Polyamide compositions L1 and L2 may each, individually, optionally further contain one or more additives. Useful additives include, for example, an external lubricant, such as PTFE or low density polyethylene (LDPE), to facilitate extrusion. Suitable powdered PTFE include POLYMIST® F5A available from Solvay Solexis.

Another useful additive is a heat stabilizer. Suitable heat stabilizers include copper-containing stabilizers comprising a copper compound soluble in the polyamide and an alkali metal halide. More particularly, in certain embodiments the stabilizer comprises a copper (I) salt, for example cuprous acetate, cuprous stearate, a cuprous organic complex compound such as copper acetylacetonate, a cuprous halide or the like, and an alkali metal halide. In certain embodiments of the present invention, the stabilizer comprises a copper halide selected from copper iodide and copper bromide and an alkali metal halide selected from the iodides and bromides of lithium, sodium, and potassium. Formulations comprising copper (I) halide, an alkali metal halide and a phosphorus compound can also be employed to improve the stability of hollow bodies formed from polyphthalamide compositions during extended exposure to temperatures up to about 140° C. The amount of the stabilizer used is preferably that amount sufficient to provide a level of from about 50 ppm to about 1000 ppm copper. Preferred compositions of the invention comprise an alkali metal halide and copper (I) halide at a weight ratio the range of from about 2.5 to about 10, and most preferably from about 8 to about 10. Generally, the combined weight of copper and alkali metal halide compound in a stabilized polyamide composition ranges from about 0.01 weight % to about 2.5 weight %. In certain other stabilized polyamide compositions used to form hollow bodies according to the present invention, the stabilizer is present in the range of from about 0.1 weight % to about 1.5 weight %.

A particularly suitable stabilizer for polyamide compositions according to the present invention comprises pellets of a 10:1 by weight mixture of potassium iodide and cuprous iodide with a magnesium stearate binder. The potassium iodide/cuprous iodide heat stabilizer provides protection against long term heat aging, such as exposure to under-the-hood automobile temperatures.

Another useful additive is a filler such as a reinforcing filler, or structural fiber. Structural fibers useful in forming filled articles and composite products include glass fiber, carbon or graphite fibers and fibers formed of silicon carbide, alumina, titania, boron and the like, as well as fibers formed from high temperature engineering resins such as, for example, poly(benzothiazole), poly(benzimidazole), polyarylates, poly(benzoxazole), aromatic polyamides, polyaryl ethers and the like, and may include mixtures comprising two or more such fibers. Suitable fibers useful herein include glass fibers, carbon fibers and aromatic polyamide fibers such as the fibers sold by the DuPont Company under the trade name KEVLAR®.

Another useful additive is an antioxidant. Useful antioxidants include Nauguard 445, phenols (for ex. Irganox 1010, Irganox 1098 from Ciba), phosphites, phosphonites (e.g., Irgafos 168 from Ciba, P-EPQ from Clariant or Ciba), thio-synergists (e.g., Lowinox DSTDP from Great Lakes), hindered amine stabilizers (e.g., Chimasorb 944 from Ciba), hydroxyl amines, benzofuranone derivatives, acryloyl modified phenols, etc.

Other fillers which may also be used in polyamide compositions according to the invention include antistatic additives such as carbon powders, multi-wall carbon nanotubes and single wall nanotubes as well as flake, spherical and fibrous particulate filler reinforcements and nucleating agents such as talc, mica, titanium dioxide, potassium titanate, silica, kaolin, chalk, alumina, mineral fillers, and the like. The fillers and structural fiber may be used alone or in any combination.

Further useful additives include, without limitation, pigments, dyes, flame retardants, and the like, including those additives commonly used in the resin arts. The additives may be employed alone or in any combination, as needed. For particular applications, it may also be useful to include plasticizers, lubricants, and mold release agents, as well as thermal, oxidative and light stabilizers, and the like. The levels of such additives can be determined for the particular use envisioned by one of ordinary skill in the art in view of this disclosure.

Methods

The invention hollow bodies may be made by any technique known in the art or later developed, including in particular, extrusion. In this regard, one of ordinary skill in the art is capable of forming the hollow bodies of the invention as described herein using polyamide compositions L1 and L2 in view of this disclosure.

The physical dimensions of the invention hollow body are not limited. When the invention hollow body is a tube or hose, preferred inner diameter ranges from, for example, 2 mm to 20 mm, more preferably, 3 mm to 18 mm. Preferred outer diameters range from 3 mm to 26 mm, more preferably 5 mm to 22 mm. Preferred total wall thicknesses range from 0.5 mm to 2.5 mm, more preferably 1 mm to 2 mm. Where the hollow body comprises two and only two layers, L1/L2, the preferred thickness ratio L1/L2 ranges from 9 to 0.1, more preferably 4 to 0.25. While L1 and L2 can each make up inner and outer layers in the invention, in such two-layer configurations composition L1 is preferably the outer layer when heat resistance or chemical resistance is the requirement. In such two layer configurations, L1 is preferably the inner layer when barrier resistance (low permeation) is the requirement. In three layer configurations composition L1 is both the inner and outer layer, although the inner and outer layer compositions in such a configuration need not be identical.

EXAMPLES

Provided below are examples illustrative of the present invention, but not limitative thereof.

Table 1 describes four compositions. In addition, a control composition C1 was prepared of unmodified AMODEL® A-1006 PPA.

TABLE 1

Polyphthalamide Compositions

| | Examples | | | |
|---|---|---|---|---|
| Component | 1 | 2 | 3 | 4 |
| AMODEL ® A-1004 PPA (wt. %) | 75.75 | 74.75 | 74.18 | 73.18 |
| maleic anhydride functionalized EPDM (wt. %) | 0 | 25 | 0 | 25 |
| maleic anhydride functionalized SEBS (wt. %) | 24 | 0 | 24 | 0 |

TABLE 1-continued

Polyphthalamide Compositions

| | Examples | | | |
|---|---|---|---|---|
| Component | 1 | 2 | 3 | 4 |
| 10/1 KI/CuI stabilizer (wt. %) | 0 | 0 | 1.57 | 1.57 |
| Powdered PTFE (wt. %) | 0.25 | 0.25 | 0.25 | 0.25 |
| Total | 100 | 100 | 100 | 100 |

Films of Examples 1, 2 and C1 were produced by extrusion. ISO 1BA tensile specimens were punched from the films. They were elongated at a crosshead speed of 0.5 mm/min and tested under the conditions of ISO 527. As shown below in Table 2, impact modification provides polymer compositions that have higher average tensile elongation at yield and break over unmodified control C1. In fact, invention PPA compositions comprising impact modifier have tensile elongation at yield and break more than twice as high as control. The higher tensile elongation at yield and break provides greater latitude in the processing parameters of the hollow bodies of the present invention.

TABLE 2

| | Examples | | |
|---|---|---|---|
| | 1 | 2 | C1 |
| Impact Modifier | SEBS | EPDM | Unmodified |
| Test Temperature (° C.) | 23 | 23 | 23 |
| Prior Conditioning | dry as molded | dry as molded | 23° C./ 50% RH |
| Average Tensile Elongation at Yield (%) | 7.7 | 9.3 | 3.0 |
| Average Tensile Elongation at Break (%) | 154 | 169 | 66 |

Fuel Permeation Tests

Fuel permeation tests were conducted on the Example compositions, control, and comparative compositions. The results of the fuel permeation tests are shown in Table 3 below. The fuel permeation tests were performed on films from the same specimens as those listed in Table 2.

In addition to impact modified PPA compositions Examples 1 and 2, permeability measurements were also carried out on liquid crystal polymer (LCP) Vectra® A950, PA12, and the following unmodified PPA compositions: AMODEL® A-1006-C, A-4000, and A-6000. These film specimens were prepared by coextrusion between two peelable high density polyethylene (HDPE) layers.

TABLE 3

| | Average Thickness | CTF1 fuel at 60° C., permeabilities in g · mm/m² · day | | |
|---|---|---|---|---|
| Examples | (μm) | Ethanol | Isooctane | Toluene |
| LCP, Vectra® A950 | 14 | <0.001 | <0.001 | <0.001 |
| AMODEL® A-1006-C, annealed 165° C./20 h | 58 | 0.024 | <0.001 | <0.001 |
| AMODEL® A-4000, annealed 160° C./22.25 h | 42 | 0.22 | <0.001 | 0.003 |
| AMODEL® A-6000, annealed 165° C./20 h | 38 | 1.1 | <0.001 | 0.02 |
| Example 1 | 51 | 2.219 | 0.002 | 0.159 |
| Example 2 | 98 | 1.927 | <0.001 | 0.038 |
| PA12, Grilamid® L25W40 | ~45 | >125 (tentative) | 17 (tentative) | >177 (tentative) |

The fuel tested is CTF1, a 45/45/10 by volume isooctane/toluene/ethanol blend. See standard SAE J1681 rev. January 2000.

The measured fuel permeability is expressed as the number of grams of permeant that would permeate through a sheet of thickness 1 mm thickness and a surface area of 1 m² sheet in a 1 day period. The results obtained with a grade of LCP (liquid crystal polymer) Vectra® A950 exhibiting superior barrier properties are given for reference and illustrate detection limits of the method.

The permeability of the modified PPA, Examples 1 and 2, is superior to aliphatic PA. PA12 is highly permeable and a steady-state was never reached. Ethanol and toluene began to seep very quickly after the test was launched and the cell rapidly became depleted of these species. Tentative permeability values were calculated from mass transfer measurements carried out at the beginning of the test via chromatography. The values tabulated are believed to be lower than the actual permeability values.

Table 4 below summarizes permeability results measured at 60° C. on various fluoropolymers. As can be seen from Tables 3 and 4, all the invention PPA compositions (annealed at 165° C. or dry as molded) have fuel permeations comparable to the fluoropolymers and superior to polyamides. Despite the fact that the incorporation of elastomers in the polyamide compositions of the invention is generally thought to be detrimental to the barrier properties of PPA, especially as regards the alcohol and the aromatic components in the fuel, very good barrier properties are retained. As regards toluene and isooctane permeability, the elastomer modified polyphthalamide compositions are at least as good as the fluoropolymers listed in Table 4 and are superior to PA. For the ethanol component of CTF1 fuel at 60° C., the modified polyphthalamides are only slightly less effective than the poly(vinylidene fluoride) (PVDF) homopolymer and ethylene-tetrafluoroethylene copolymer (ETFE), at least as good as the other fluoropolymers listed in Table 4, and superior to PA.

TABLE 4

| Polymer | Thickness (μm) | Fuel | Isooctane (g · mm/ m2 · day) | Toluene (g · mm/ m2 · day) | Ethanol (g · mm/ m2 · day) | Methanol (g · mm/ m2 · day) |
|---|---|---|---|---|---|---|
| LCP, VECTRA® A950 | 25 | CTF1 | <0.01 | <0.01 | <0.02 | — |
| PVDF, homopolymer SOLEF® 1010 | 50 | CTF1 | <0.01 | 0.85 | 1.3 | — |
| PVDF, copolymer SOLEF® 61010 | 50 | CTF1 | 0.2 | 6.6 | 7.1 | — |
| TFE/HFP/VF2 terpolymer THV™ 500G | 50 | CTF1 | 0.5 | 5.7 | 4.7 | — |

TABLE 4-continued

| Polymer | Thickness (μm) | Fuel | Isooctane (g · mm/ m2 · day) | Toluene (g · mm/ m2 · day) | Ethanol (g · mm/ m2 · day) | Methanol (g · mm/ m2 · day) |
|---|---|---|---|---|---|---|
| ETFE, TEFZEL ® 280 | 50 | CTF1 | 0.05 | 2.4 | 1.8 | — |
| PCTFE, ACLAR ® 33C | 50 | CTF1 | 0.4 | 5.6 | 2.3 | — |

Extraction Data

While the leaching of components of polymeric fuel line components is less critical in vapor lines, the presence of such impurities in the liquid fuel line can lead to injector fouling. The solution used for the extraction study consisted of a mixture of 15% methanol and 85% of a 50/50 mixture of toluene/isooctane by volume (CM 15 fuel). The procedure for extraction comprised placing 15 grams of pellets in 80 ml of agitated liquid at 40° C. for 168 hours, and measuring the dried residue of the decanted solution. The percent extractables for Examples 1 and 2 were measured to be 0.17 and 0.20% respectively. While not zero, the extractable values are surprisingly low compared to the 8 to 12% extractables that would be expected for plasticized PA12 currently used as a monolayer hoses.

Heat Aging Comparisons With PA12

Resistance to long term heat aging is considered extremely important to the viability of using polymers in fuel lines with the ever increasing temperature requirements in automobiles. A comparison of heat stabilized versions of Examples 3 and 4 with heat stabilized PA12 is provided in Table 5.

TABLE 5

| | Izod Impact (ft-lbs/in.) Strength After 255 Hours at Temperature | | | |
|---|---|---|---|---|
| Examples | 23° C. (Initial) | 140° C. | 150° C. | 160° C. |
| PA12 | 20.46 | 0.67 | 0.69 | 0.16 |
| 3 | 19.73 | 17.07 | 15.02 | 12.47 |
| 4 | 19.8 | 17.07 | 14.99 | 11.77 |

As can be seen, the PA12 undergoes a catastrophic loss in Izod impact strength after heat aging. Consequently, the partially aromatic impact modified polyamides are a much safer choice for retention of impact properties after long term exposure to elevated temperatures in the presence of air.

Manufacture of Hoses from Impact Modified Polyphthalamide

Monolayer Tubing

The set up for extrusion of mono-layer tubing is shown in FIG. 1. Materials were dried prior to melt processing. Extrusion of the tubing was carried out with a 30 mm single screw extruder. The screw used was a standard polyamide or polyethylene screw. Calibration and cooling were done with standard equipment. The cooling tank was under vacuum and in the spray mode.

Data for Examples 1-4 are shown below (Table 6). In table 6, the three zones labeled Z1, Z2, and Z3, (rear to front) are where temperature control can be applied to the extruder. Z4 is the die adaptor temperature control, and Zc1, Zc2 and Zc3 and control zones for the die. The die was set up so that the tubing dimension was 8 mm OD and 6 mm ID.

TABLE 6

| Temperature Settings, ° C. | Example 1 | Example 2 | Example 3 | Example 4 |
|---|---|---|---|---|
| Z1 (barrel 1) | 280 | 280 | 280 | 280 |
| Z2 (barrel 2) | 315 | 315 | 315 | 315 |
| Z3 (barrel 3) | 325 | 320 | 320 | 320 |
| Z4 (adaptor) | 320 | 215 | 315 | 315 |
| Zc1 (die inlet) | 325 | 320 | 320 | 320 |
| Zc2 (die body) | 325 | 320 | 320 | 320 |
| Zc3 (die exit nozzle) | 310 | 305 | 305 | 305 |
| Screw Speed, rpm | 44 | 44 | 44 | 44 |
| Calibration Vacuum, bar relative | −0.5 to −0.7 | −0.5 to −0.7 | −0.5 to −0.7 | −0.5 to −0.7 |
| Cooling water T° ° C. | 24 | 23 | 24 | 21 |

Examples 1-4 and a PA 12 control tubing made from Vestamide® L2140 were subjected to several tests in the SAE J2260 'NONMETALIC FUEL SYSTEM TUBING WITH ONE OR MORE LAYERS'. This was done to establish suitability of the PPA tubing for the intended application. The results are summarized in Table 7.

TABLE 7

| SAE 2260 Test | Example 1 | Example 2 | Example 3 | Example 4 | PA 12 Control |
|---|---|---|---|---|---|
| Roon Temperature Burst Pressure, Mpa | >5 | >5 | >5 | >5 | >5 |
| Minimum Bend Radius, mm | 40 | 40 | 40 | 40 | 40 |
| Resistance to Zinc Chloride | Pass | Pass | Pass | Pass | Pass |
| Cold Temperature Impact (−40° C.) | No Break | No Break | No Break | No Break | No Break |
| Fuel Resistance CM 15 Exposure @ 40° C., 42 days, followed by Cold Temperature Impact (−40° C.) | No Break | No Break | No Break | No Break | No Break |

The hose made from the Example 2 composition was pushed onto a standard 9 mm connector without splitting, which is a standard requirement for fuel line connector hose. The hose must be elongated by about 50% in order to be pushed onto the connector. This further illustrates utility as a fuel hose.

Tubing Examples 1-4 and a PA 12 control were tensile property tested according to ISO 527-2. The results are shown in Table 8. Examples 1-4 show higher strength (22 to 35%) than PA 12.

TABLE 8

| Mechanical Properties | Example 1 | Example 2 | Example 3 | Example 4 | PA 12 Control |
|---|---|---|---|---|---|
| Tensile Strength @ Yield, Mpa (ISO 527-2) | 42 | 44 | 43 | 47 | 35 |
| Elongation @ Break, % (ISO 527-2) | 98 | 101 | 117 | 102 | 101 |
| Tensile Modulus, Mpa, (ISO 527-2) | 1950 | 1850 | 1984 | 1866 | 1757 |

Multilayer Tubing

Figure 2:
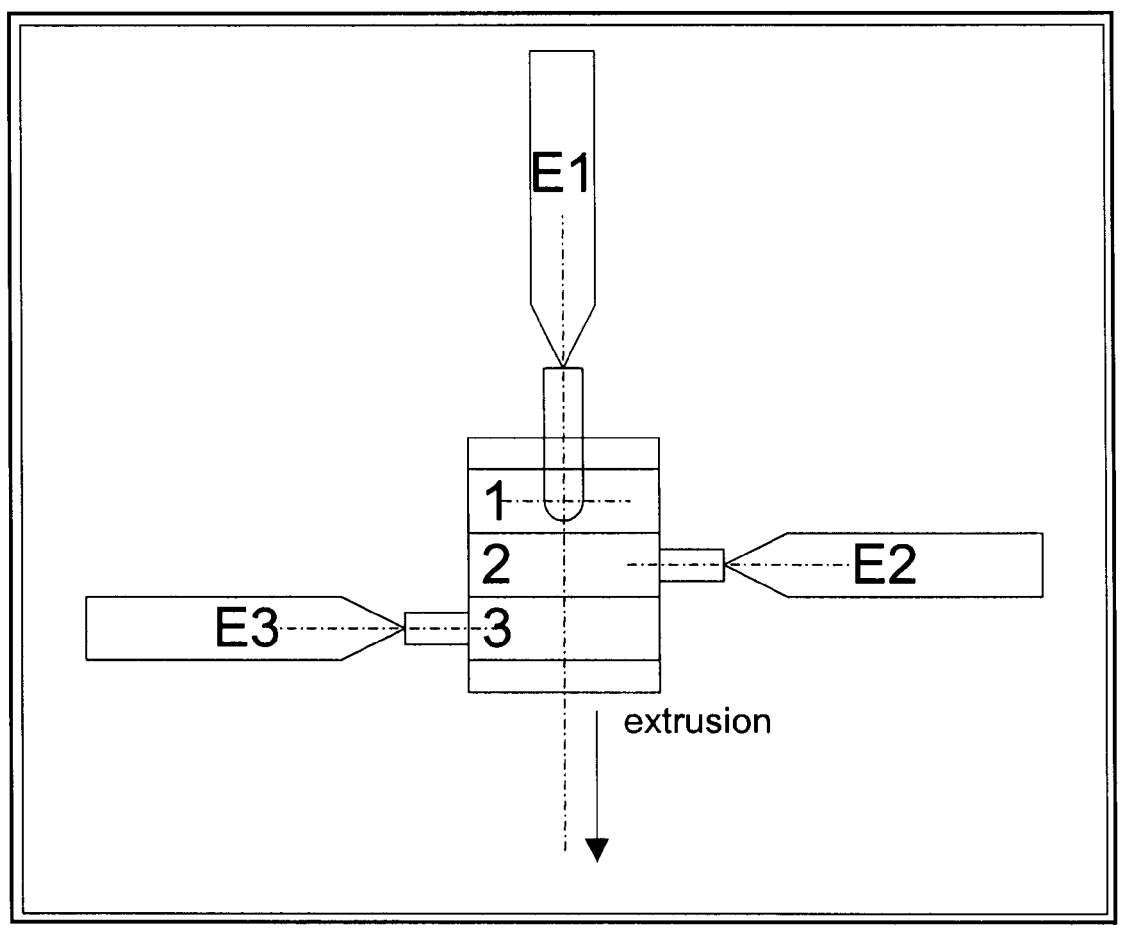
FIG. 2 is an illustration of an extrusion set up used to extrude multilayer hoses according to the invention.

The diagram in FIG. 2 illustrates how the three extruders were configured to a three layer die in order to produce multi-layer tubes. Extruders are labeled E1, E2, and E3. E1 holds material L1; E2 holds material L2; and E3 holds L2 or L1 depending on whether two layer or three layer tubing is produced. All extruders were 20 mm diameter and used standard polyethylene or polyamide screws.

For two layer constructions, the L2 (PA 6, PA 12, etc.) material was introduced in both extruders E2 and E3. PPA Formulation Example 2 was always introduced in extruder E1 (inner layer).

For three layers constructions, the L2 polyamide (PA 6 etc.) was introduced in extruder E2. The L1 polyamide (PPA Formulation Example 2) was introduced in extruder E1 (inner layer) and E3 (outer layer).

Calibration and cooling were done with standard equipment. The cooling tank was under vacuum and in the spray mode.

The material corresponding to the inner layer (layer #1) was fed from the rear of the die, while the inlet corresponding to the outer layer (layer #3) was located on the downstream side of the die.

Before the extrusion runs, all PPA and PA grades were dried.

Data for Examples 5-8 are shown below (Table 9). In Table 9, the three zones labeled Z1, Z2, and Z3, (rear to front) are where temperature control can be applied to the extruder. The adaptor, elbow to die inlet, flow distributor and die temperatures are also shown in Table 9. Each extruder (E1, E2, E3) are controlled independently.

TABLE 9

| Multi-Layer Extrusion Conditions | Example 5 PPA/PA 6 | Example 6 PPA/PA 12 U | Example 7 PPA/PA 12 P | Example 8 PPA/PA6/PPA |
|---|---|---|---|---|
| Extruder E1/L1 | | | | |
| Z1, °C. | 309 | 309 | 309 | 310 |
| Z2, °C. | 329 | 325 | 325 | 325 |
| Adaptor exit E1, °C. | 325 | 325 | 325 | 325 |
| Elbow to die inlet L1, °C. | 325 | 325 | 325 | 325 |
| Screw Speed, rpm | 40 | 60 | 60 | 60 |
| Extruder E2/L2 | | | | |
| Z1, °C. | 228 | 209 | 209 | 231 |
| Z2, °C. | 258 | 259 | 260 | 280 |
| Z3, °C. | 279 | 279 | 279 | 316 |
| Adaptor exit E2, °C. | 288 | 286 | 286 | 298 |
| Elbow to die inlet L2, °C. | 315 | 315 | 315 | 325 |
| Screw Speed, rpm | 40 | 40 | 40 | 50 |
| Extruder E3/L3 | | | | |
| Z1, °C. | 229 | 209 | 210 | 308 |
| Z2, °C. | 261 | 261 | 261 | 315 |
| Z3, °C. | 281 | 280 | 281 | 327 |
| Adaptor exit E3, °C. | 281 | 280 | 270 | 299 |
| Elbow to die inlet L3, °C. | 315 | 315 | 315 | 325 |
| Screw Speed, rpm | 40 | 40 | 40 | 60 |
| Die | | | | |
| Flow Distributor L1, °C. | 320 | 320 | 320 | 325 |
| Flow Distributor L2, °C. | 315 | 315 | 315 | 325 |
| Flow Distributor L3, °C. | 310 | 310 | 310 | 324 |
| Downstream Plate | 310 | 310 | 310 | 324 |
| Die Outlet | 310 | 310 | 310 | 325 |

TABLE 9-continued

| Multi-Layer Extrusion Conditions | Example 5 PPA/PA 6 | Example 6 PPA/PA 12 U | Example 7 PPA/PA 12 P | Example 8 PPA/PA6/PPA |
|---|---|---|---|---|
| Calibrator | | | | |
| Calibrator vacuum, bar relative | −0.38 to −0.5 | −0.6 to −0.62 | −0.5 to −0.7 | −0.2 |
| Cooling water T°, ° C. | 20 to 24 | 20 to 24 | 20 to 24 | 20 to 24 |

Example 5

Two Layer Coextrusion of PPA (L1)/PA 6 (L2)

An extrusion run was started with HDPE in the inner layer (1) and Grilon® F50 PA6 in the two outer layers (2,3) The intermediate temperature of 280° C. was used for adjusting the die settings. Both materials extruded well at this temperature and a nice tube was produced. No adhesion between the PA 6 and the PE was observed.

After raising the temperatures (see Table 9), HDPE in the inner layer (1) was replaced with PPA (Formulation Example 2), a multi-layer tube structure was obtained.

Adhesion between the L1 (PPA Formulation Example 2) inner layer and L2 (PA 6) outer layer of the co extruded tubing is demonstrated by cutting lengths of the tubing longitudinally in half and flexing and bending the resultant half of the tubing. The layers did not separate.

Example 6

Two Layer Coextrusion of PPA (L1)/PA 12 U (L2)

With the same set up as for the PA6 co-extrusion in Example 5, the Grilon® F50 PA6 was replaced by Vestamide® L2140, unplasticized PA 12. (PA 12 U). The cooling in the calibrator had to be adjusted to a lower temperature and acceptable tubing could be produced. The adhesion of the two layers (PPA Formulation Example 2 and PA 12 U) as tested in the manner described above was excellent. The layers did not separate.

Example 7

Two Layer Coextrusion of PPA (L1)/PA 12P (L2)

Vestamide® L2140 (PA 12 U) was replaced with Vestamide® LX9013 (highly plasticized PA 12, (PA 12 P)). Tubing was produced as in Example 5. The adhesion between the two layers (PPA Formulation Example 2 and PA 12 P) as tested in the manor described above was excellent. The layers did not separate.

Example 8

Three Layer Coextrusion of PPA (L1)/PA 6 (L2)/PPA (L1)

The trial was started with HDPE in the inner layer (1) and Grilon® F50 PA6 in the middle layer (2) and HDPE in the outer layer (3) The intermediate temperature of 280° C. was used for adjusting the die settings. Both materials extruded well at this temperature and a nice tube was produced. No adhesion between the PA 6 and the PE was observed.

After raising the temperatures of the HDPE in the inner layer (1) and the outer layer (3), PPA (Formulation Example 2) was introduced. A three layer construction was obtained.

Adhesion between the three layers (L1=PPA Formulation 2; L2=PA 6; L3=PPA Formulation Example 2) of the co-extruded tubing as tested in the manor described above showed excellent adhesion. The layers did not separate.

As described herein, in certain embodiments of the present invention, the hollow body comprises a monolayer structure of the L1 composition. As used herein, a "monolayer" is formed from single layer of a polymer composition wherein the polymer composition is substantially the same across the entire thickness of the layer. In certain embodiments of the present invention, the thickness of the monolayer can range from about 500 microns to about 12.5 mm. In certain embodiments of the present invention, the monolayer thickness ranges from about 750 microns to about 7 mm.

The hollow bodies of the invention can be used in any number of articles of manufacture, machines, etc, such as fossil fuel powered motor devices, etc. Fossil fuel powered motor devices, as used herein, include motor vehicles such as automobiles, motorcycles, buses, and trucks, aircraft, watercraft, recreational vehicles, and agricultural and industrial equipment. The hollow bodies can have surfaces that are rough, smooth, corrugated, etc. that are of a constant thickness throughout or a variable thickness, etc. In addition, the invention hollow bodies can be used to enclose or encapsulate a content, and the content can vary widely. For example, the hollow body of the invention can be used as a cable protection system. In this regard the invention is also disclosed as actually containing or holding its intended content—for example, the invention describes and enables a hollow body in the form of a fuel line, said fuel line optionally comprising fuel.

The above written description of the invention provides a manner and process of making and using it such that any person skilled in this art is enabled to make and use the same, this enablement being provided in particular for the subject matter of the appended claims, which make up a part of the original description and including a hollow body comprising, as sole layers, (1) at least one layer L1 comprising an aromatic polyamide and an impact modifier, and, optionally, (2) at least one layer L2 comprising an aliphatic polyamide.

Similarly enabled preferred embodiments of the invention include hollow bodies wherein the aromatic polyamide is a polyphthalamide; the aliphatic polyamide is an aliphatic nylon; the impact modifier is selected from the group consisting of EPDM, SEBS, and mixtures thereof; the aromatic polyamide is a polyamide having at least 50 mol. % of recurring units obtained by a polycondensation reaction between at least one dicarboxylic acid selected from the group consisting of phthalic, terephthalic, and isophthalic acids and mixtures thereof and at least one aliphatic diamine; the polyphthalamide comprises from about 50 mole % to about 95 mole % hexamethylene terephthalamide units, from about 25 mole % to about 0 mole % hexamethylene isophthalamide units, and from about 50 mole % to about 5 mole % hexamethylene adipamide units; the impact modifier is a rubber; the rubber is a functionalized polyolefin-based rubber; the functionalized polyolefin-based rubber is a maleic anhydride functionalized styrene-ethylene-butylene-styrene block copolymer; the functionalized polyolefin based rubber is a maleic anhydride functionalized ethylene-propylene-diene monomer rubber; the layers are contiguous layers of the order $[(L1)_n/(L2)_m]_x$ where x is any integer of 1 or greater, n is any integer of 1 or greater, and m is any integer; the layer L1 further comprises an external lubricant; the external lubricant is selected from the group consisting of polytetrafluoroethylene, low density polyethylene, and mixtures thereof; layer L1 further comprises a heat stabilizer comprising at least one copper (I) salt and at least one alkali metal halide; the heat stabilizer comprises at least one copper halide selected from the group consisting of copper iodide and copper bromide and at least one alkali metal halide selected from the group consisting of the iodides and bromides of lithium, sodium, and potassium; the hollow body consists of, as sole layer, a monolayer comprising an aromatic polyamide and an impact modifier; the hollow body is a hose; the hose comprises all or part of a vapor return line or a liquid fuel line; a fossil fuel powered device, such as an automobile, comprising the invention hose; and a method for making a hollow body comprising, as sole layers, (1) at least one layer L1 comprising an aromatic polyamide and an impact modifier, and, optionally, (2) at least one layer L2 comprising an aliphatic polyamide, comprising extruding an aromatic polyamide and an impact modifier, and optionally extruding an aliphatic polyamide, through a die.

As used herein, where a certain polymer is noted as being "obtained from" or "comprising", etc. one or more monomers (or monomer units) this description is of the finished polymer material itself and the repeating units therein that make up, in whole or part, this finished product. One of ordinary skill in the art understands that, speaking precisely, a polymer does not include individual, unreacted "monomers," but instead is made up of repeating units derived from reacted monomers.

All references, patents, applications, tests, standards, documents, publications, brochures, texts, articles, etc. mentioned herein are incorporated herein by reference. Similarly, all brochures, technical information sheets, etc. for all commercially available materials are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

The invention claimed is:

1. A method for making a hollow body comprising, as sole layer(s), at least one layer L1 consisting of a polyamide composition comprising an aromatic polyamide and an impact modifier, said method comprising extruding the polyamide composition through a die.

2. The method according to according to claim 1, wherein said hollow body is a hose.

3. The method according to claim 1, wherein the aromatic polyamide is a polyphthalamide.

4. The method according to claim 3, wherein the polyphthalamide comprises from about 50 mole % to about 95 mole % hexamethylene terephthalamide units, from about 25 mole % to about 0 mole % hexamethylene isophthalamide units, and from about 50 mole % to about 5 mole % hexamethylene adipamide units.

5. The method according to claim 1, wherein the impact modifier is a rubber.

6. The method according to claim 5, wherein the rubber is a functionalized polyolefin-based rubber.

7. A method for making a hollow body comprising, as sole layers, at least two layers L1 consisting of a polyamide composition comprising an aromatic polyamide and an impact modifier, said method comprising extruding the polyamide composition through a die.

8. A method for making a hollow body comprising, as sole layer, one layer L1 consisting of a polyamide composition comprising an aromatic polyamide and an impact modifier, said method comprising extruding the polyamide composition through a die.

9. The method according to according to claim 8, wherein said layer L1 further comprises polytetrafluoroethylene.

10. The method according to according to claim 8, wherein said layer L1 further comprises a heat stabilizer comprising at least one copper (I) salt and at least one alkali metal halide.

11. The method according to according to claim 8, wherein said hollow body is a hose.

12. The method according to according to claim 8, wherein the thickness of the layer ranges from about 500 microns to about 12.5 mm.

13. The method according to according to claim 8, wherein the thickness of the layer ranges from about 750 microns to about 7 mm.

14. The method according to according to claim 8, wherein the thickness of the layer ranges from 0.5 mm to 2.5 mm.

15. The method according to according to claim 8, wherein the thickness of the layer ranges from 1 mm to 2 mm.

16. The method according to claim 8, wherein said aromatic polyamide is a polyphthalamide.

17. The method according to according to claim 16, wherein the polyphthalamide comprises from about 50 mole % to about 95 mole % hexamethylene terephthalamide units, from about 25 mole % to about 0 mole % hexamethylene isophthalamide units, and from about 50 mole % to about 5 mole % hexamethylene adipamide units.

18. The method according to claim 8, wherein the impact modifier is a rubber.

19. The method according to according to claim 18, wherein the rubber is a functionalized polyolefin-based rubber.

20. The method according to according to claim 19, wherein the functionalized polyolefin-based rubber is selected from the group consisting of a maleic anhydride functionalized ethylene-propylene-diene monomer rubber, a maleic anhydride functionalized styrene-ethylene-butylene-styrene block copolymer, and mixtures thereof.

21. A method for making a hollow body comprising, as sole layers,
(1) at least one layer L1 comprising an aromatic polyamide and an impact modifier, and
(2) at least one layer L2 comprising an aliphatic polyamide, said method comprising extruding an aromatic polyamide and an impact modifier, and extruding an aliphatic polyamide, through a die.

22. The method according to according to claim 21, wherein layer L1 comprises from 5 weight % to 40 weight % impact modifier, based on the total weight of layer L1.

* * * * *